Patented Jan. 16, 1940

2,187,694

UNITED STATES PATENT OFFICE 2,187,694

GERANYL CROTONATE

Harold R. Slagh, Midland, Mich., assignor to The Dow Chemical Company, Midland, Mich., a corporation of Michigan No Drawing. Application September 23, 1937, Serial No. 165,347

3 Claims. (Cl. 260—486)

The present invention relates to geranyl crotonate, a new unsaturated ester having the formula:

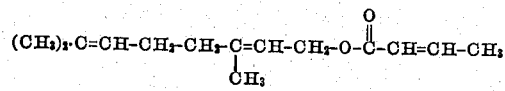

It is a colorless mobile liquid with a fragrant odor, and is useful as an ingredient in perfumes, as a solvent for a variety of substances, and as a modifying agent in the polymerization of vinyl compounds, particularly styrene.

Geranyl crotonate may be prepared by reacting crotonic acid or crotonyl chloride with geraniol. It may also be prepared by reacting silver crotonate with geranyl chloride.

In preparing geranyl crotonate, I prefer to use approximately one mol of crotonic acid and a slight molecular excess, e. g., 1 to 2 moles, of geraniol, although other proportions may be used. If desired, a small proportion of an esterification catalyst, e. g., sulfuric acid, may also be employed. The reactants are mixed and heated at a moderate temperature, e. g., 75° C. to 150° C., for a period of 5 to 30 hours. When reaction is complete, the mixture is fractionally distilled at reduced pressure to separate the ester.

In preparing geranyl crotonate as just described, I have found that the yield of ester may be improved by adding to the reaction mixture a water-immiscible liquid which forms an azeotropic mixture with water. As the reaction proceeds, this azeotrope may be boiled off, thus removing water formed during the esterification and causing the reaction to proceed more nearly to completion. Chlorobenzene has been found particularly suitable for this purpose.

The following example illustrates one way in which the principle of the invention has been employed, but is not to be construed as limiting the scope thereof:

Example 1

A mixture of 43 grams of crotonic acid, 92.5 grams of geraniol, and 273 grams of chlorobenzene was heated at a temperature of 135° to 140° C. for 26 hours. During this time the chlorobenzene-water azeotrope distilled slowly from the mixture and was condensed, the water being separated and the chlorobenzene returned to the reaction zone. In all 7 grams of water was thus removed. When the reaction was complete, the mixture was fractionally distilled at reduced pressure, the fraction distilling at temperatures between about 128° C. at 0.10 inch absolute pressure and about 136° C. at 0.12 inch pressure being collected. This fraction consisted of 43 grams of geranyl crotonate, a colorless mobile liquid having a specific gravity of about 0.914 at 25°/25° C.

Other modes of applying the principle of my invention may be employed, change being made as regards the details hereinbefore disclosed, provided the product stated by the following claims or the equivalent for such stated product be employed.

I therefore particularly point out and distinctly claim as my invention:

1. Geranyl crotonate, a colorless mobile liquid with a fragrant odor, having a boiling point of about 128° C. at 0.10 inch absolute pressure, and a specific gravity of about 0.914 at 25°/25° C.

2. The method of making geranyl crotonate which comprises reaction geraniol with crotonic acid in the presence of a water-immiscible liquid capable of forming an azeotropic mixture with water, and continuously removing the water formed during the esterification by distilling a mixture of water and said immiscible liquid from the reaction mixture.

3. The method of making geranyl crotonate which comprises reacting geraniol with crotonic acid in the presence of chlorobenzene, and continuously removing the water formed during the esterification by distilling a mixture of water and chlorobenzene from the reaction mixture.

HAROLD R. SLAGH.